US010896410B2

(12) United States Patent
Xu et al.

(10) Patent No.: US 10,896,410 B2
(45) Date of Patent: Jan. 19, 2021

(54) METHOD AND SYSTEM FOR PROVIDING TRANSACTION INFORMATION FOR MULTIPLE PAYMENT PLATFORMS

(71) Applicant: Tencent Technology (Shenzhen) Company Limited, Shenzhen (CN)

(72) Inventors: Zhenyu Xu, Shenzhen (CN); Dacheng Zhuo, Shenzhen (CN); Wei Mao, Shenzhen (CN); Deyuan Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 484 days.

(21) Appl. No.: 15/186,119

(22) Filed: Jun. 17, 2016

(65) Prior Publication Data

US 2016/0300202 A1    Oct. 13, 2016

Related U.S. Application Data

(63) Continuation of application No. PCT/CN2014/086269, filed on Sep. 11, 2014.

(30) Foreign Application Priority Data

Jan. 10, 2014   (CN) .......................... 2014 1 0012728

(51) Int. Cl.
*G06Q 50/00*    (2012.01)
*G06Q 20/10*    (2012.01)
(Continued)

(52) U.S. Cl.
CPC ......... *G06Q 20/10* (2013.01); *G06F 16/9535* (2019.01); *G06Q 20/4014* (2013.01); *G06Q 50/01* (2013.01); *H04L 67/42* (2013.01)

(58) Field of Classification Search
USPC ...................................................... 705/35, 44
See application file for complete search history.

(56) References Cited

U.S. PATENT DOCUMENTS 7,558,777 B1*  7/2009  Santos ................... G06Q 10/10
8,060,423 B1*  11/2011  Rukonic ............... G06Q 40/00
                                                               705/35
(Continued)

FOREIGN PATENT DOCUMENTS

CN        1744128 A      3/2006
CN      101604427 A     12/2009
(Continued)

OTHER PUBLICATIONS

Financial Account Aggregation: The Liability Perspective Ann H. Spiotto (Year: 2003).*

(Continued)

*Primary Examiner* — William E Rankins
(74) *Attorney, Agent, or Firm* — Morgan, Lewis & Bockius LLP

(57) ABSTRACT

A server system with processor(s) and memory obtains transaction information for a plurality of payment transactions executed on two or more online payment platforms and stores a plurality of transaction information entries for the plurality of payment transactions. The server system receives a transaction history request from a first user. In response to the transaction history request, the server system: obtains, from the stored plurality of transaction information entries, two or more transaction information entries associated with the first user, the two or more transaction information entries correspond to at least a first transaction executed on a first online payment platform and at least a second transaction executed on a second online payment platform; and provides transaction history information to the (Continued)

first user, the transaction history information includes the two or more transaction information entries associated with the first user.

18 Claims, 11 Drawing Sheets

(51) Int. Cl.
*G06F 16/9535* (2019.01)
*G06Q 20/40* (2012.01)
*H04L 29/06* (2006.01)

(56) References Cited

U.S. PATENT DOCUMENTS

| | | | | |
|---|---|---|---|---|
| 8,781,923 B2* | 7/2014 | Pitroda | ............... | G06Q 20/3227 |
| | | | | 705/30 |
| 2005/0039013 A1* | 2/2005 | Bajikar | ................... | G06F 21/32 |
| | | | | 713/172 |
| 2006/0036586 A1* | 2/2006 | Krakowiecki | ........ | G06F 16/951 |
| 2006/0203274 A1* | 9/2006 | Hirose | ................... | G06F 3/1207 |
| | | | | 358/1.13 |
| 2007/0130257 A1* | 6/2007 | Bedi | .................... | G06Q 10/107 |
| | | | | 709/204 |
| 2011/0238538 A1* | 9/2011 | Allison, Jr. | ............ | G06Q 40/12 |
| | | | | 705/30 |
| 2012/0023142 A1* | 1/2012 | Diorio | ................... | G06F 16/215 |
| | | | | 707/805 |
| 2013/0030889 A1* | 1/2013 | Davich | ................... | G06Q 30/02 |
| | | | | 705/14.14 |
| 2014/0040114 A1* | 2/2014 | Baumgart | ............ | G06Q 20/027 |
| | | | | 705/39 |
| 2015/0142642 A1* | 5/2015 | Suplee | ................... | G06Q 40/02 |
| | | | | 705/39 |

FOREIGN PATENT DOCUMENTS

| | | |
|---|---|---|
| CN | 101632077 A | 1/2010 |
| CN | 102664967 A | 9/2012 |
| CN | 103179089 A | 6/2013 |
| EP | 1811440 A1 | 7/2007 |
| WO | WO 2013087984 A1 | 6/2013 |

OTHER PUBLICATIONS

Tencent Technology, ISRWO, PCTCN2014086269, Dec. 16, 2014, 6 pgs.

Tencent Technology, IPRP, PCTCN2014086269, Jul. 12, 2016, 4 pgs.

* cited by examiner

METHOD AND SYSTEM FOR PROVIDING TRANSACTION INFORMATION FOR MULTIPLE PAYMENT PLATFORMS

PRIORITY CLAIM AND RELATED APPLICATIONS

This application is a continuation application of PCT Patent Application No. PCT/CN2014/086269, entitled "METHOD AND SYSTEM FOR PROVIDING TRANSACTION INFORMATION FOR MULTIPLE PAYMENT PLATFORMS" filed on Sep. 11, 2014, which claims priority to Chinese Patent Application No. 201410012728.6, entitled "DATA OUTPUT CONTROL METHOD AND DEVICE," filed on Jan. 10, 2014, both of which are incorporated by reference in their entirety.

TECHNICAL FIELD

The present disclosure relates to the field of Internet technologies, and, more particularly, to a method and system for maintaining and providing transaction information for multiple payment platforms.

BACKGROUND

A transaction record is produced when a payment platform performs a payment transaction, and the transaction information is stored (e.g., for query and output). Generally, a respective transaction record includes various types of information such as a transaction, a transaction amount, and transaction time. At present, transaction records are automatically kept by a transaction system after a payment platform (i.e., a third-party payment platform) completes a payment transaction.

With third-party payment, an independent institution with professional competence and guaranteed credibility signs contracts with major banks and provides a payment platform which interfaces with a bank payment settlement system. In the "third-party payment" mode, after purchasing an item (e.g., a good or service), a buyer makes payment using an account provided by the third-party payment platform and holds the payment in escrow; then the third-party payment platform informs a seller that the buyer has paid for the item and requests that the seller deliver the item to the buyer; after receiving and checking the item, the buyer informs the third-party payment platform to release the payment to the seller; and then the third-party payment platform transfers the payment into an account of the seller. At present, as an online transaction means and credit intermediary, the third-party payment platform serves an important function by establishing a connection between an online business and a bank and also providing supervision of the third-party payment and technical support.

In the online transaction environment, the third-party payment solves, to some degree, problems with online bank payment (e.g., the inability of the two transaction parties to supervise each other, the singleness of the payment manner, lack of guarantee in terms of quality of the goods, transaction trust, the return or replacement of goods, and the like) during the transaction process and also the widespread existence of fraudulent transactions. The advantages of the third-party payment mode are reflected in the following aspects:

First, from a merchant's point of view, usage of the third-party payment platform, prevents the risk of not receiving payment from a customer and also diversifies the number of payment tools that can be provided to customers. The third-party payment platform serves as a viable alternative to establishing a gateway interface to a bank, especially small and medium-sized enterprises;

Second, from a consumer's point of view, usage of the third-party payment platform reduces the risk of not receiving goods, guarantees quality of the goods, and increase confidence of customers in online transactions; and Third, from a bank's point of view, usage of the third-party payment expands the bank's business scope and also saves development and maintenance expenses caused by providing a great number of small and medium-sized enterprises with a gateway interface.

As such, third-party payment protects the interests of transaction parties. At present, there are various types of third-party payment platforms, and users often use various payment platforms to make payments. Some of the payment platforms record transaction records while others do not, and those payment platforms which keep transaction records only record transactions completed by such payment platform. Therefore, when wishing to view transaction records, a user must log into various payment platforms and separately view transaction records stored by each payment platform, which is inconvenient and inefficient.

SUMMARY

The embodiments of the present disclosure provide methods and systems for maintaining and providing transaction information that may address the problems stated in the background section.

In some embodiments, a method of maintaining transaction information for a plurality of payment platforms is performed at a server system (e.g., server system 108, FIGS. 1-2) with one or more processors and memory. The method includes obtaining transaction information for a plurality of payment transactions executed on two or more online payment platforms and storing a plurality of transaction information entries for the plurality of payment transactions. The method includes receiving a transaction history request from a first user. In response to the transaction history request, the method includes: obtaining, from the stored plurality of transaction information entries, two or more transaction information entries associated with the first user, the two or more transaction information entries correspond to at least a first transaction executed on a first online payment platform and at least a second transaction executed on a second online payment platform; and providing transaction history information to the first user, the transaction history information including the two or more transaction information entries associated with the first user.

In some embodiments, a computer system (e.g., server system 108 (FIGS. 1-2), client device 104 (FIGS. 1 and 3), or a combination thereof) includes one or more processors and memory storing one or more programs for execution by the one or more processors, the one or more programs include instructions for performing, or controlling performance of, the operations of any of the methods described herein. In some embodiments, a non-transitory computer readable storage medium storing one or more programs, the one or more programs comprising instructions, which, when executed by a computer system (e.g., server system 108 (FIGS. 1-2), client device 104 (FIGS. 1 and 3), or a combination thereof) with one or more processors, cause the computer system to perform, or control performance of, the operations of any of the methods described herein. In some embodiments, a computer system (e.g., server system 108 (FIGS. 1-2), client device 104 (FIGS. 1 and 3), or a combination thereof) includes means for performing, or controlling performance of, the operations of any of the methods described herein.

Various advantages of the present application are apparent in light of the descriptions below.

BRIEF DESCRIPTION OF THE DRAWINGS

The aforementioned features and advantages of the techniques as well as additional features and advantages thereof will be more clearly understood hereinafter as a result of a detailed description of preferred embodiments when taken in conjunction with the drawings.

To illustrate the technical solutions according to the embodiments of the present application more clearly, the accompanying drawings for describing the embodiments are introduced briefly in the following. The accompanying drawings in the following description are only some embodiments of the present application; persons skilled in the art may obtain other drawings according to the accompanying drawings without paying any creative effort.

Like reference numerals refer to corresponding parts throughout the several views of the drawings.

DESCRIPTION OF EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. Apparently, the described embodiments are merely a part rather than all of the embodiments of the present application. All other embodiments obtained by persons of ordinary skill in the art based on the embodiments of the present application without creative efforts shall fall within the protection scope of the present application.

Figure 1:
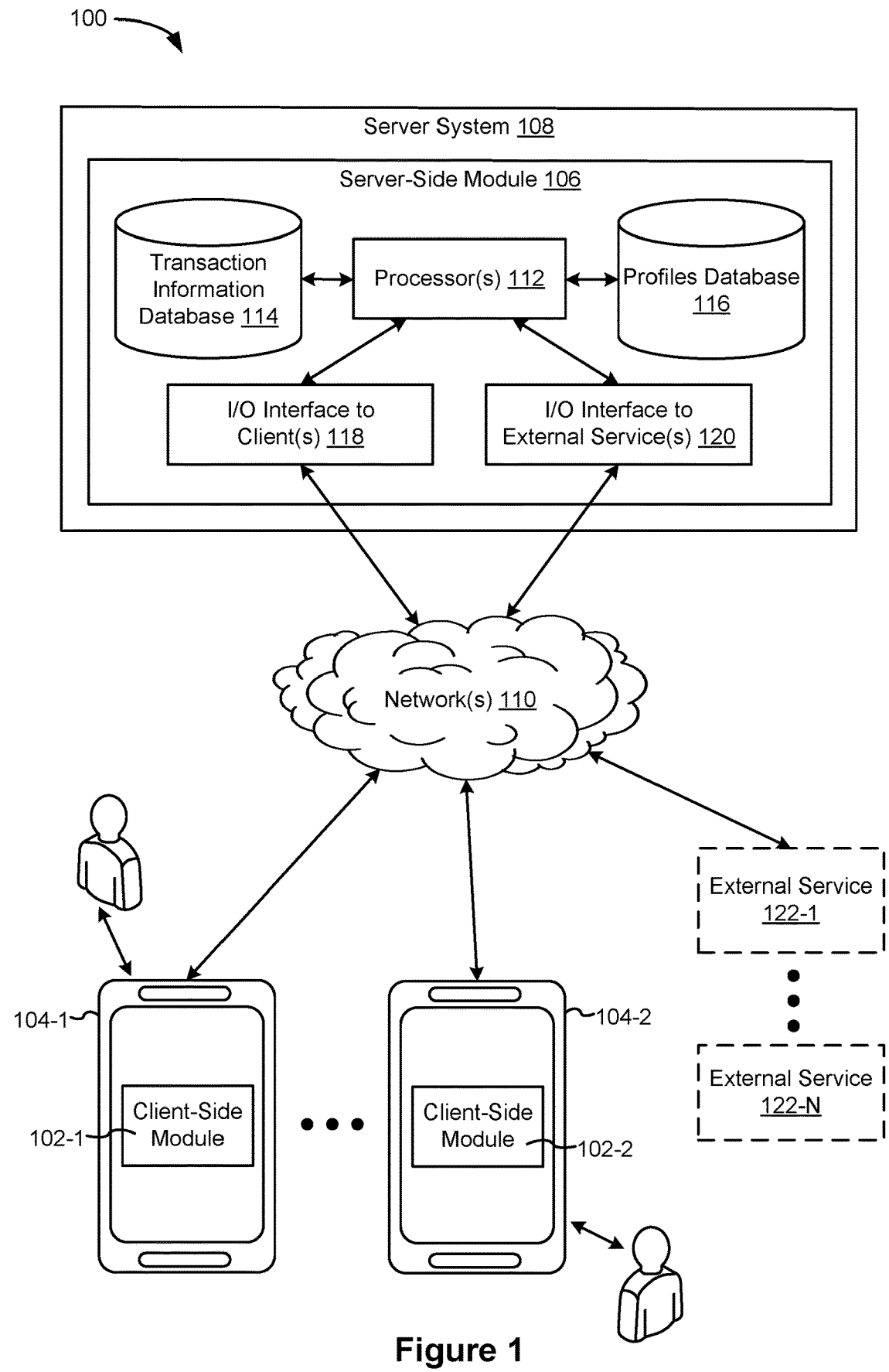
FIG. 1 is a block diagram of a server-client environment in accordance with some embodiments.

As shown in FIG. 1, data processing for a social networking platform is implemented in a server-client environment 100 in accordance with some embodiments. In accordance with some embodiments, server-client environment 100 includes client-side processing 102-1, 102-2 (hereinafter "client-side module 102") executed on a client device 104-1, 104-2, and server-side processing 106 (hereinafter "server-side module 106") executed on a server system 108. Client-side module 102 communicates with server-side module 106 through one or more networks 110. Client-side module 102 provides client-side functionalities for the social networking platform (e.g., instant messaging, social networking services, and payment processing) and communications with server-side module 106. Server-side module 106 provides server-side functionalities for the social networking platform (e.g., instant messaging, social networking services, and payment processing) for any number of client modules 102 each residing on a respective client device 104.

In some embodiments, server-side module 106 includes one or more processors 112, transaction information database 114, profiles database 116, an I/O interface to one or more clients 118, and an I/O interface to one or more external services 120. I/O interface to one or more clients 118 facilitates the client-facing input and output processing for server-side module 106. One or more processors 112 obtain transaction information for a plurality of payment transactions executed on two or more online payment platforms and provides requested transaction history information to client-side modules 102. Transaction information database 114 stores a plurality of transaction information entries for each of the plurality of payment transactions, and profiles database 116 stores a user profile for each user of the social networking platform. I/O interface to one or more external services 120 facilitates communications with one or more external services 122 (e.g., merchant websites, credit card companies, and/or other payment processing services).

Examples of client device 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatuses or a distributed network of computers. In some embodiments, server system 108 also employs various virtual devices and/or services of third party service providers (e.g., third-party cloud service providers) to provide the underlying computing resources and/or infrastructure resources of server system 108.

Server-client environment 100 shown in FIG. 1 includes both a client-side portion (e.g., client-side module 102) and a server-side portion (e.g., server-side module 106). In some embodiments, data processing is implemented as a stand-alone application installed on client device 104. In addition, the division of functionalities between the client and server portions of client environment data processing can vary in different embodiments. For example, in some embodiments, client-side module 102 is a thin-client that provides only user-facing input and output processing functions, and delegates all other data processing functionalities to a backend server (e.g., server system 108).

Figure 2:
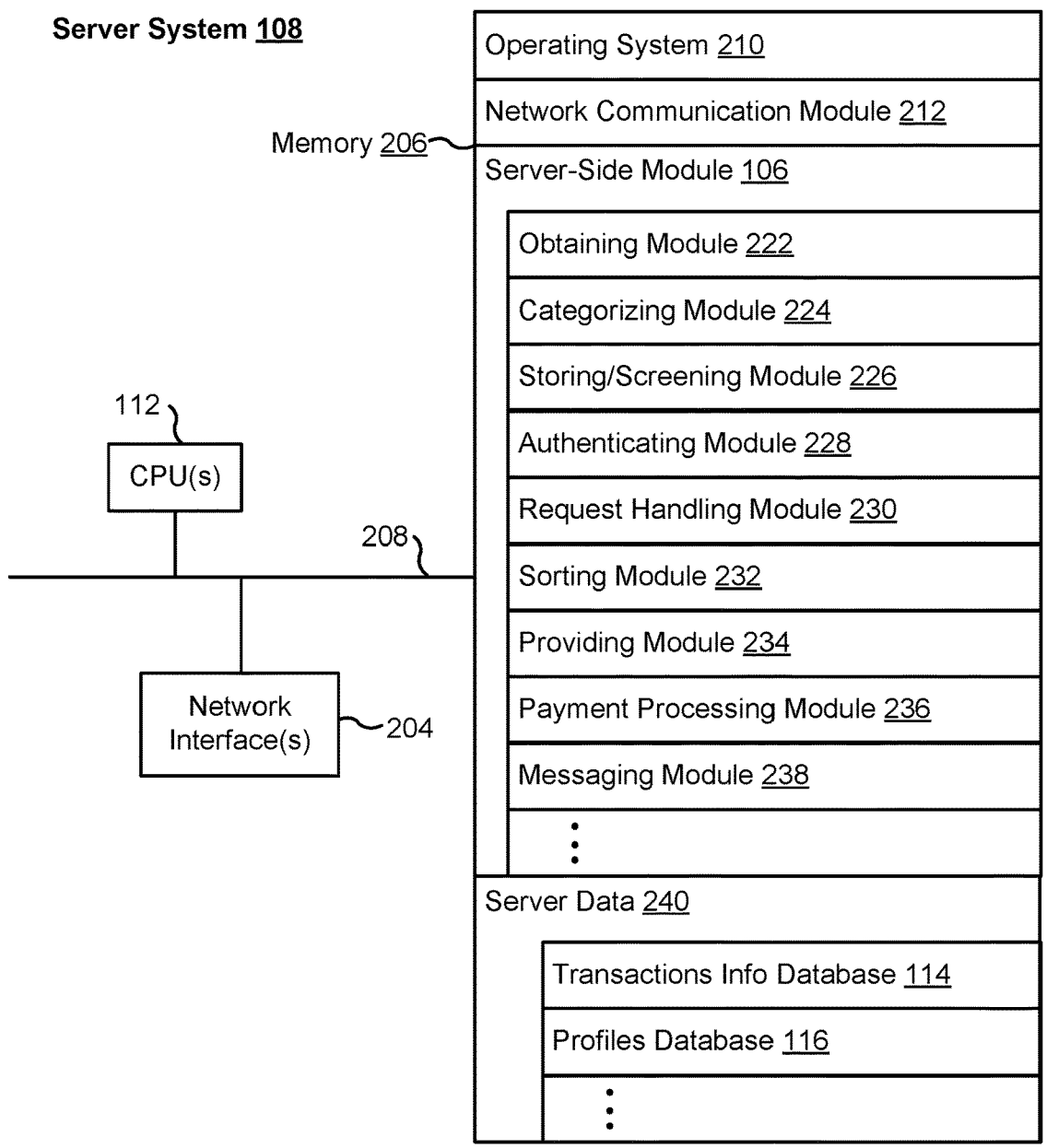
FIG. 2 is a block diagram of a server system in accordance with some embodiments.

FIG. 2 is a block diagram illustrating server system 108 in accordance with some embodiments. Server system 108, typically, includes one or more processing units (CPUs) 112, one or more network interfaces 204 (e.g., including I/O interface to one or more clients 118 and I/O interface to one or more external services 120), memory 206, and one or more communication buses 208 for interconnecting these components (sometimes called a chipset). Memory 206 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 206, optionally, includes one or more storage devices remotely located from one or more processing units 112. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

- operating system 210 including procedures for handling various basic system services and for performing hardware dependent tasks;
- network communication module 212 for connecting server system 108 to other computing devices (e.g., client devices 104 and external service(s) 122) connected to one or more networks 110 via one or more network interfaces 204 (wired or wireless);
- server-side module 106, which provides server-side data processing for the social networking platform (e.g., instant messaging, social networking services, and/or payment processing), includes, but is not limited to:
  - obtaining module 222 for obtaining transaction information for a plurality of payment transactions executed on two or more online payment platforms;
  - categorizing module 224 for categorizing the plurality of payment transactions;
  - storing module 226 for storing transaction information entries in transaction information database 114 for each of the plurality of payment transactions;
  - authenticating module 228 for verifying that login credentials for an account of the social networking platform, received from a respective user, match login credentials stored in a user profile for the respective user in profiles database 116;
  - request handling module 230 for handling and responding to transaction history requests from users of the social networking platform for corresponding transaction information;
  - sorting/screening module 232 for sorting and/or screening transaction information for the respective user according to one or more parameters included in the transaction history request;
  - providing module 234 for transaction history information to the respective user in response to the transaction history request;
  - payment processing module 236 for processing transactions for the respective user of the social networking platform based on payment data in a user profile in profiles database 116 corresponding to the respective user; and
  - messaging module 238 for managing and routing messages sent between users of the social networking platform; and
- server data 240 storing data for the social networking platform, including but not limited to:
  - transaction information database 114 storing a plurality of transaction information entries for each of the plurality of payment transactions executed on two or more payment platforms; and
  - profiles database 116 storing user profiles for users of the social networking platform, where a respective user profile for a user includes a user/account name or handle, login credentials to the social networking platform, payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, memory 206, optionally, stores a subset of the modules and data structures identified above. Furthermore, memory 206, optionally, stores additional modules and data structures not described above.

Figure 3:
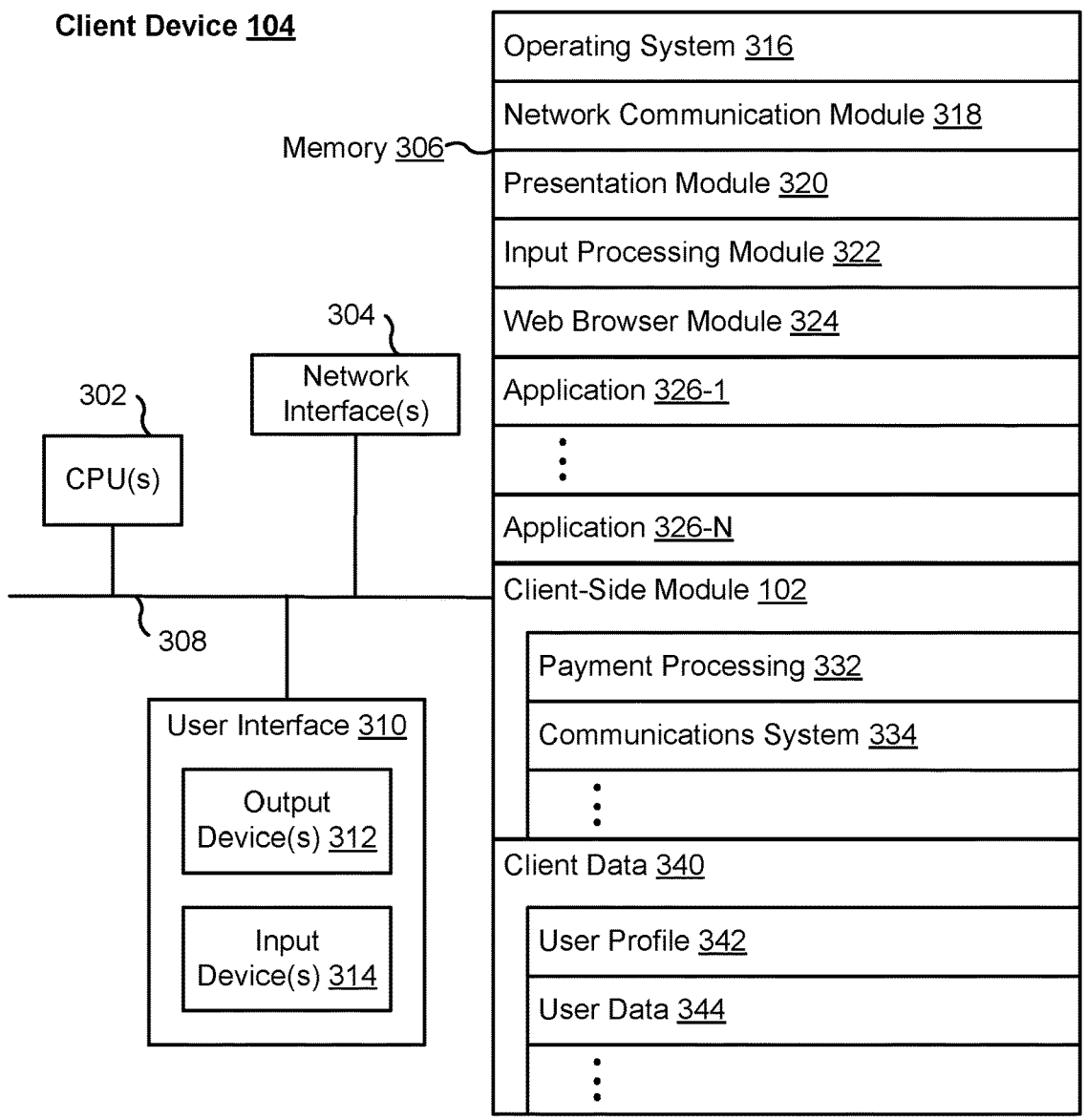
FIG. 3 is a block diagram of a client device in accordance with some embodiments.

FIG. 3 is a block diagram illustrating a representative client device 104 associated with a user in accordance with some embodiments. Client device 104, typically, includes one or more processing units (CPUs) 302, one or more network interfaces 304, memory 306, and one or more communication buses 308 for interconnecting these components (sometimes called a chipset). Client device 104 also includes a user interface 310. User interface 310 includes one or more output devices 312 that enable presentation of media content, including one or more speakers and/or one or more visual displays. User interface 310 also includes one or more input devices 314, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 104 use a microphone and voice recognition or a camera and gesture recognition to supplement or replace the keyboard. Memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. Memory 306, optionally, includes one or more storage devices remotely located from one or more processing units 302. Memory 306, or alternatively the non-volatile memory within memory 306, includes a non-transitory computer readable storage medium. In some implementations, memory 306, or the non-transitory computer readable storage medium of memory 306, stores the following programs, modules, and data structures, or a subset or superset thereof:

- operating system 316 including procedures for handling various basic system services and for performing hardware dependent tasks;
- network communication module 318 for connecting client device 104 to other computing devices (e.g., server system 108 and external service(s) 122) connected to one or more networks 110 via one or more network interfaces 304 (wired or wireless);
- presentation module 320 for enabling presentation of information (e.g., a user interface for a social networking platform, widget, webpage, game, and/or application, audio and/or video content, text, etc.) at client device 104 via one or more output devices 312 (e.g., displays, speakers, etc.) associated with user interface 310;
- input processing module 322 for detecting one or more user inputs or interactions from one of the one or more input devices 314 and interpreting the detected input or interaction;
- web browser module 324 for navigating, requesting (e.g., via HTTP), and displaying websites and web pages thereof;
- one or more applications 326-1-326-N for execution by client device 104 (e.g., games, application marketplaces, payment platforms, and/or other applications); and
- client-side module 102, which provides client-side data processing and functionalities for the social networking platform, including but not limited to:
  - payment processing 332 for processing payments associated with transactions initiated within the social networking platform or at a merchant's website within web browser module 324; and
  - communication system 334 for sending messages to and receiving messages from other users of the social networking platform (e.g., instant messaging, group chat, message board, message/news feed, and the like); and
- client data 340 storing data associated with the social networking platform, including, but is not limited to:
  - user profile 342 storing a user profile associated with the user of client device 104 including user a/account name or handle, login credentials to the social networking platform, payment data (e.g., linked credit card information, app credit or gift card balance, billing address, shipping address, etc.), custom parameters (e.g., age, location, hobbies, etc.) for the user, social network contacts, groups of contacts to which the user belongs, and identified trends and/or likes/dislikes of the user; and
  - user data 344 storing data authored, saved, liked, or chosen as favorites by the user of client device 104 in the social networking platform.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 306, optionally, stores a subset of the modules and data structures identified above. Furthermore, memory 306, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in FIGS. 2-3, respectively, are merely illustrative, and different configurations of the modules for implementing the functions described herein are possible in various embodiments.

Figure 4:
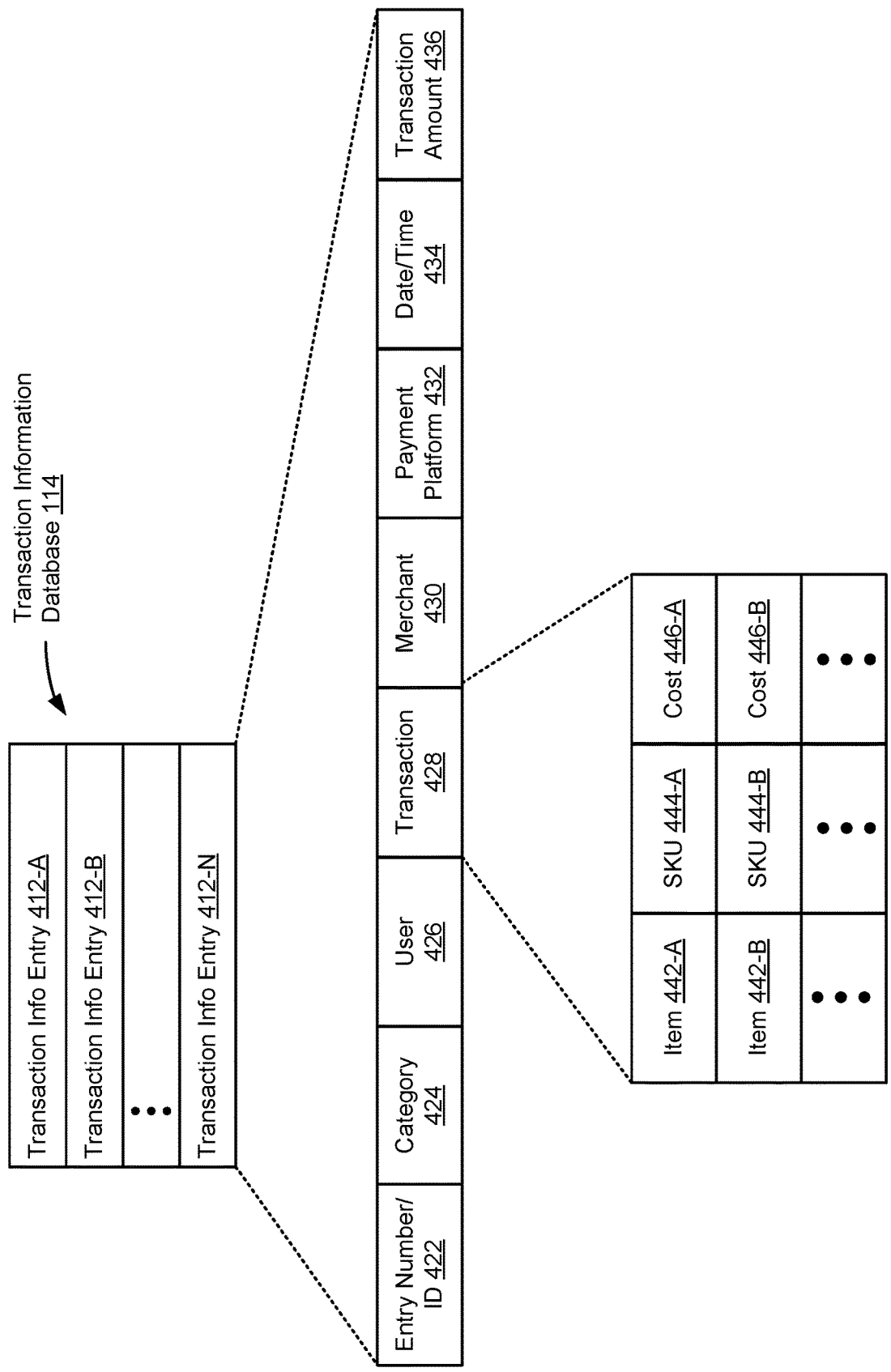
FIG. 4 is a block diagram of a transaction information database in accordance with some embodiments.

FIG. 4 is a block diagram of transaction information database 114 and related data structures in accordance with some embodiments. In some embodiments, transaction information database 114 is stored and managed by server system 108. In some embodiments, transaction information database 114 is stored remote from server system 108 but is managed by server system 108. In some embodiments, server system 108 manages a social networking platform that enables real-time chat/messaging between users, and server system 108 also provides payment processing services for transaction initiated at a merchant's website or within the social networking platform.

In some embodiments, transaction information database 114 includes a plurality of transaction information entries 412 for each of a plurality of payment transactions. In some embodiments, the plurality of payment transactions correspond to payment transactions executed on two or more online payment platforms.

In FIG. 4, representative transaction information entry 412-N for a payment transaction includes a plurality of fields: entry number/identifier 422, category 424, user name 426, transaction 428, merchant 430, payment platform 434, date/time 434, and transaction amount 436. In some embodiments, entry number/identifier field 422 is a unique number or identifier associated with the payment transaction. In some embodiments, category field 424 identifies a category associated with the payment transaction. For example, the category corresponds to the method by which the payment transaction was initiated (e.g., in-app purchase, app store purchase, online shopping purchase, etc.). In another example, the category corresponds to items included in the payment transaction (e.g., automotive parts, sporting goods, groceries, clothing, etc.). In some embodiments, user name field 426 identifies an account or user name in the social networking platform for the user who initiated the payment transaction. In some embodiments, merchant field 430 identifies the name of the merchant which the user initiated the payment transaction. In some embodiments, payment platform field 432 identifies the payment platform on which the payment transaction was executed. In some embodiments, date/item field 434 identifies the date and/or time that the payment transaction was initiated. In some embodiments, transaction amount field 436 identifies the total amount for the payment transaction.

In some embodiments, transaction field 428 identifies the goods and/or services associated with the payment transaction. In some embodiments, transaction field 428 includes entries for each of the items associated with the payment transaction. For example, an entry for a respective item associated with the payment transaction includes the name or description 442-A of the respective item, an stock keeping unit (SKU) or other identifier 444-A for the respective item, and cost 446-A for the respective item.

Figure 5A:
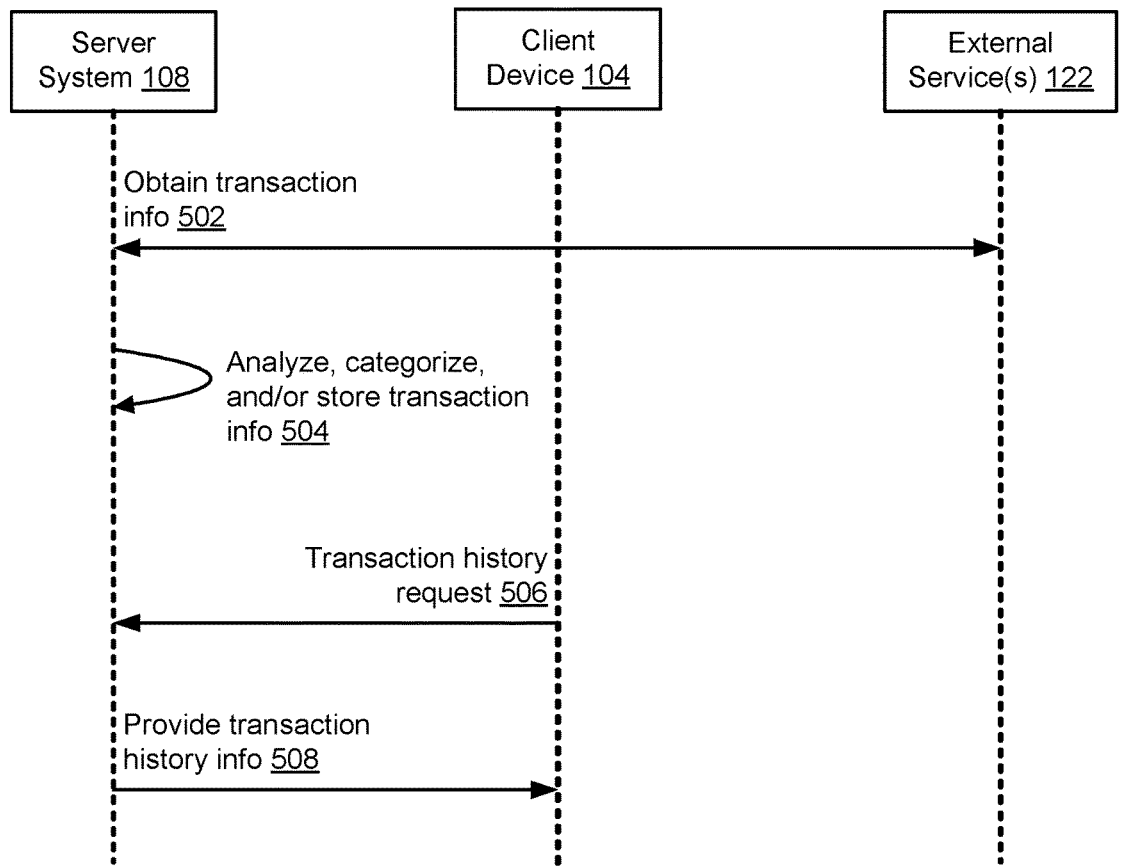
FIGS. 5A-5B illustrate flow diagrams of methods of maintaining transaction information for a plurality of payment platforms in accordance with some embodiments.

FIG. 5A illustrates a flow diagram of a method 500 of maintaining transaction information for a plurality of payment platforms in accordance with some embodiments. In some embodiments, method 500 is performed in sever-client environment 100 (FIG. 1) with server system 108, client device 104, and external service(s) 122 each of which includes one or more processors and memory. In some embodiments, server system 108 manages a social networking platform that enables real-time chat/messaging between users, and server system 108 also provides payment processing services (e.g., a payment platform) for transactions initiated at a merchant's website or within the social networking platform.

In some embodiments, server system 108 obtains (502) transaction information from external service(s) 122 for a plurality of payment transactions executed on two or more online payment platforms. For example, for a respective user of the social networking platform, server system 108 obtains transaction information from external service(s) 122 (e.g., a credit card company) for payment transactions using payment data linked to the respective user's account for the social networking platform. In this example, server system 108 stores a user profile for the respective user in profiles database 116 which includes payment data (e.g., credit card number corresponding to the credit card company) linked to the respective user's account for the social networking platform. In another example, for a respective user of the social networking platform, server system 108 obtains transaction information for transactions processed by payment processing of the social networking platform and/or by other payment platforms.

In some embodiments, server system 108 analyzes (504) the obtained transaction information so as to categorize the plurality of payment transactions and store transaction information entries in transaction information database 114 for each of the plurality of payment transactions. In some embodiments, server system 108 stores transaction information entries in transaction information database 114 for each of the plurality of payment transactions (as shown in FIG. 4).

In some embodiments, client device 104 sends (506) a transaction history request to server system 108. For example, a user of client device 104 previously logged into an account for the social networking platform, and the user is sending the transaction history request via the social networking platform. In this example, the transaction history request identifies the account in the social networking platform that corresponds to the user.

In some embodiments, in response to receiving the transaction history request, server system provides (508) transaction history information associated with user of client device 104 to client device 104. In some embodiments, the transaction history information includes two or more transaction information entries corresponding to at least a first transaction executed on a first online payment platform and at least a second transaction executed on a second online payment platform.

Figure 5B:
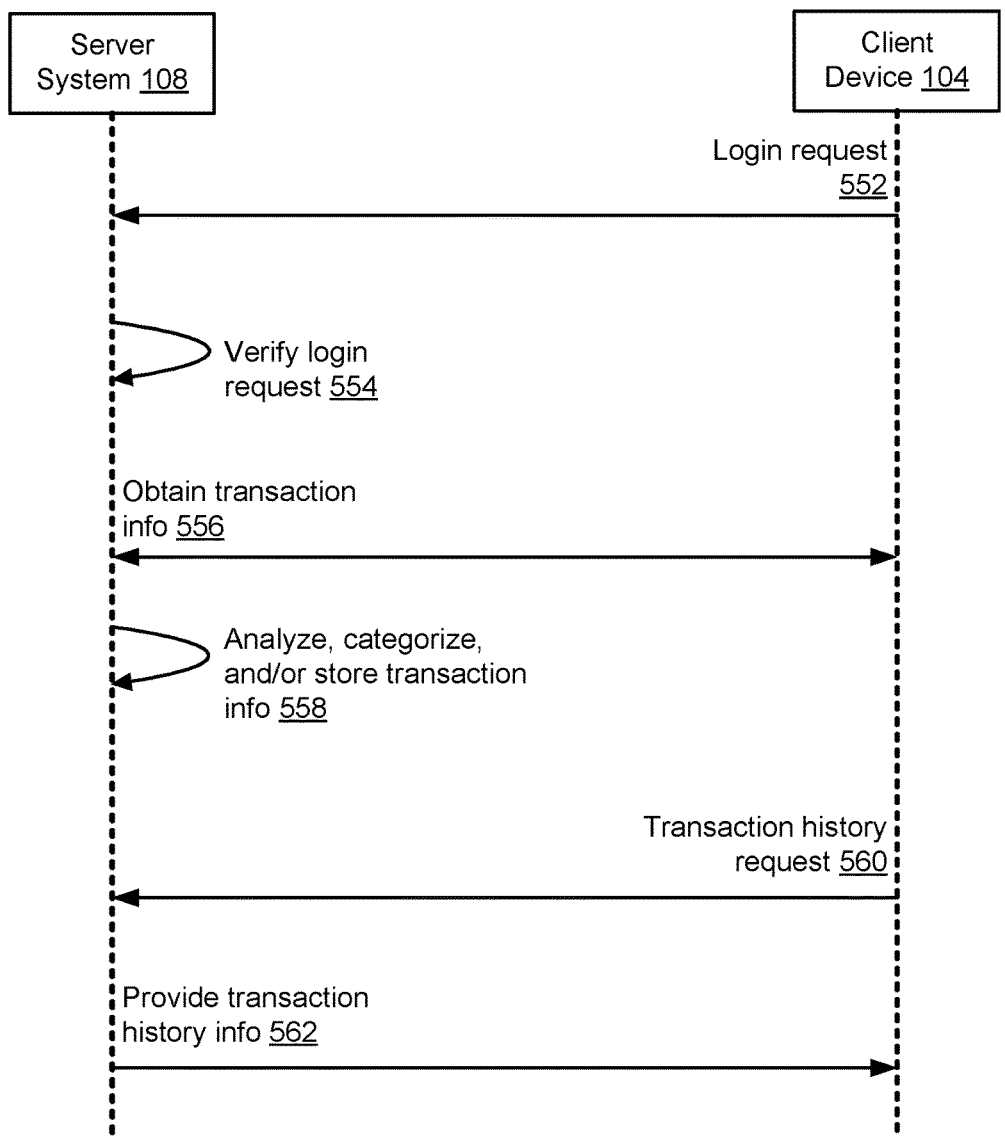

FIG. 5B illustrates a flow diagram of a method 500 of maintaining transaction information for a plurality of payment platforms in accordance with some embodiments. In some embodiments, method 550 is performed in sever-client environment 100 (FIG. 1) with server system 108 and client device 104 each of which includes one or more processors and memory. In some embodiments, server system 108 manages a social networking platform that enables real-time chat/messaging between users, and server system 108 also provides payment processing services (e.g., a payment platform) for transactions initiated at a merchant's website or within the social networking platform.

In some embodiments, client device 104 sends a login request to server system 108 to login to the social networking platform. In some embodiments, the login request includes login credentials entered by a user of client device 104 to log into a user account for the social networking platform.

In some embodiments, server system 104 verifies the login request by verifying that the login credentials included in the login request match login credentials stored in a user profile in profiles database 116 that are associated with the user of client device 104.

In some embodiments, server system 108 obtains transaction information, from client device 104, for a plurality of payment transactions executed on two or more online payment platforms by the user. For example, a payment transaction is processed by the social networking platform for a purchase within the social networking platform. In another example, a payment transaction is processed by the social networking platform for a purchase initiated at a merchant website or another application. In a further example, a payment transaction is processed by another payment platform for a purchase made within another application (e.g., a purchase within a game or within an application marketplace) or at a merchant website.

In some embodiments, server system 108 analyzes (558) the obtained transaction information so as to categorize the plurality of payment transactions and store transaction information entries in transaction information database 114 for each of the plurality of payment transactions. In some embodiments, server system 108 stores transaction information entries in transaction information database 114 for each of the plurality of payment transactions (as shown in FIG. 4).

In some embodiments, client device 104 sends (560) a transaction history request to server system 108. For example, the transaction history request is received at some time subsequent to obtaining the transaction information but while the user is still logged into the account for the social networking platform. As such, the transaction history request includes the account for the social networking platform that is associated with the user of client device 104.

In some embodiments, in response to the transaction history request, server system provides (562) transaction history information associated with first user of client device 104 to client device 104. In some embodiments, the transaction history information includes two or more transaction information entries corresponding to at least a first transaction executed on a first online payment platform and at least a second transaction executed on a second online payment platform.

Figure 6:
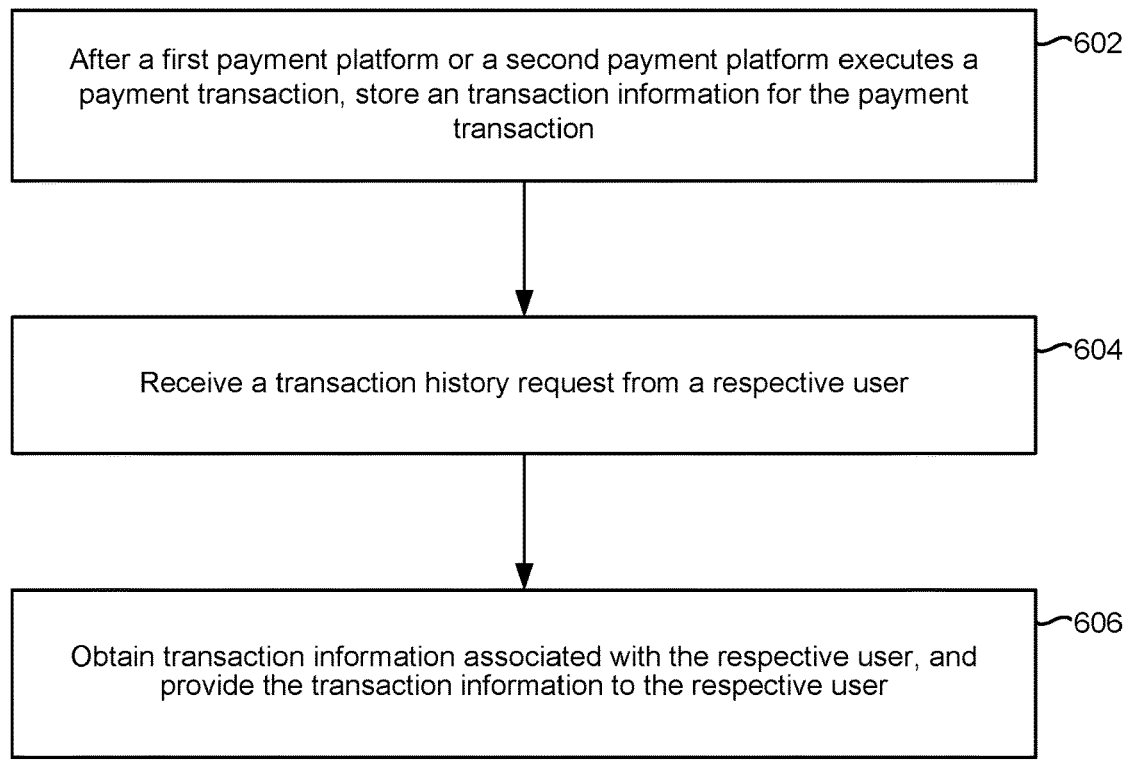
FIG. 6 illustrates a flowchart diagram of a method of maintaining transaction information for a plurality of payment platforms in accordance with some embodiments.

FIG. 6 illustrates a flowchart diagram of a method 600 of maintaining transaction information for a plurality of payment platforms in accordance with some embodiments. In some embodiments, method 600 is performed by a computers system with one or more processors and memory. For example, the computers system is implemented as server system 108 (FIG. 1-2), client device 104 (FIGS. 1 and 3), or a combination thereof. In some embodiments, the computers system manages a social networking platform that enables real-time chat/messaging between users, and the computers system also provides payment processing services (e.g., a payment platform) for transactions initiated at a merchant's website or within the social networking platform.

In some embodiments, after a first payment platform or a second payment platform executes a payment transaction, the computers system stores (602) transaction information for the payment transaction. For example, the first payment platform is associated with a social networking platform and the second payment platform is associated with an in-app purchases. Continuing with this example, transaction information for the first payment platform is stored in Table 1 and transaction information for the second payment platform is stored in Table 2. There are a plurality of types of payment platforms, which are not limited to the social networking payment platform and the in-app payment platform (e.g., another payment platform for an application marketplace). Thus, the "first" and "second" payment platforms are intended for distinguishing different payment platforms and do not indicate other technical meanings. For example, Table 1 and Table 2 are separately displayed as two tables.

Table 1 storing transaction information for the first payment platform:

| Record number | Recipient | Transaction | Amount (Yuan) | Transaction time | Payment platform |
|---|---|---|---|---|---|
| 1 | ABC Company | Phone recharge | 100.00 | 2013 Dec. 25 | social networking payment platform |
| 2 | Tencent | Annual membership fee | 120.00 | 2013 Dec. 22 | social networking payment platform |
| 3 | YiXun Store | XXX item | 530.40 | 2013 Dec. 9 | social networking payment platform |
| 4 | XYZ Online Store | AA item | 3.40 | 2013 Dec. 5 | social networking payment platform |
| — | — | — | — | — | social networking payment platform |

Table 2 storing transaction information for the second payment platform:

| Record number | Recipient | Transaction | Amount (Yuan) | Transaction time | Payment platform |
|---|---|---|---|---|---|
| 1 | ABC Company | Phone recharge | 50.00 | 2013 Dec. 26 | in-app payment platform |
| 2 | Tencent | Game card | 30.00 | 2013 Dec. 15 | in-app payment platform |
| 3 | YiXun Store | XXX item | 120.60 | 2013 Dec. 10 | in-app payment platform |
| 4 | XYZ Online Store | BBB item | 60.40 | 2013 Dec. 10 | in-app payment platform |
| — | — | — | — | — | in-app payment platform |

In some embodiments, transaction information is stored by a background process of a payment platform, where the payment platform may be the first payment platform associated with the social networking platform, the second payment platform associated with in-app purchases, or a third-party payment platform. In some embodiments, an independent database is maintained to store transaction information. For example, storing transaction information includes: storing, in the independent database managed by the first payment platform, transaction information generated by a first payment transaction executed on the first payment platform or transaction information generated by a second payment transaction executed on the second payment platform.

For example, a plurality of users share a same client device and each of the users has a respective account for social networking platform. In this example, after a respective account logs into the social networking platform on the client device, the user associated with the respective account performs one or more payment transactions using different payment platforms. Subsequently, transaction data for the one or more payment transactions is stored. Typically, a user does not care about transaction information corresponding to payment transaction initiated by other accounts. Additionally, transaction information for a respective payment transaction is generally private information that cannot be viewed by all users using the client device save the user associated with the account that initiated the respective payment transaction.

Therefore, in some embodiments: prior to either the first payment platform or the second payment platform executing a payment transaction, the computer system: receives a login request to log into the social networking platform associated with the first payment platform with a respective account; authenticates the login request; and, after authenticating the login request, obtains transaction information for a payment transactions executed by the first payment platform or the second payment platform and associated with transaction information with the respective account. In the foregoing, logging into an account for the social networking platform prior to executing a payment transaction enables the transaction information to be associated with the account. Therefore, Table 1 and Table 2 are stored as Table 3 and Table 4, respectively, as follows:

Table 3 storing transaction information for the first payment platform, where each entry is associated with an account.

| Record number | Account | Recipient | Transaction | Amount (Yuan) | Transaction time | Payment platform |
|---|---|---|---|---|---|---|
| 1 | Zhang San | ABC Company | Phone recharge | 100.00 | 2013 Dec. 25 | social networking payment platform |
| 2 | Zhang San | Tencent | Annual membership fee | 120.00 | 2013 Dec. 22 | social networking payment platform |
| 3 | Zhang San | YiXun Store | XXX item | 530.40 | 2013 Dec. 9 | social networking payment platform |
| 4 | Li Si | XYZ Online Store | AA item | 3.40 | 2013 Dec. 5 | social networking payment platform |
| ... | ... | ... | ... | ... | ... | social networking payment platform |

Table 4 storing transaction information for the second payment platform, where each entry is associated with an account.

| Record number | Account | Recipient | Transaction | Amount (Yuan) | Transaction time | Payment platform |
|---|---|---|---|---|---|---|
| 1 | Li Si | ABC Company | Phone recharge | 50.00 | 2013 Dec. 26 | in-app payment platform |
| 2 | Zhang San | Tencent | Game card | 30.00 | 2013 Dec. 15 | in-app payment platform |
| 3 | Zhang San | YiXun Store | XXX item | 120.60 | 2013 Dec. 10 | in-app payment platform |
| 4 | Zhang San | XYZ Online Store | BBB item | 60.40 | 2013 Dec. 10 | in-app payment platform |
| ... | ... | ... | ... | ... | ... | in-app payment platform |

In some embodiments, the computer system receives (604) a transaction history request from a respective user.

In some embodiments, the computer system obtains (606) transaction information associated with the respective user, and provides the transaction information to the respective user. In some embodiments, providing the transaction information comprises displaying, printing, or sending the transaction information via a preset communication method such as an SMS (short message service) or email.

In some embodiments, in response to receiving the transaction history request from the respective user, obtain transaction information from a plurality of payment platforms that was initiated by the respective user so as to provide combined transaction information from the plurality of payment platforms. In this way, the respective user does not need to separately request transaction information from each of the plurality of payment platforms nor does the respective user have to view the transaction information in a plurality of transaction information formats. Therefore, the efficiency of providing transaction information is improved.

Based on the foregoing, Table 1 and Table 2 are combined to provide transaction information as shown in Table 5:

| Record number | Recipient | Transaction | Amount (Yuan) | Transaction time | Transaction platform |
|---|---|---|---|---|---|
| 1 | ABC Company | Phone recharge | 100.00 | 2013 Dec. 25 | social networking payment platform |
| 2 | Tencent | Annual membership fee | 120.00 | 2013 Dec. 22 | social networking payment platform |
| 3 | YiXun Store | XXX item | 530.40 | 2013 Dec. 9 | social networking payment platform |
| 4 | XYZ Online Store | AA item | 3.40 | 2013 Dec. 5 | social networking payment platform |
| 5 | ABC Company | Phone recharge | 50.00 | 2013 Dec. 26 | in-app payment platform |
| 6 | Tencent | Game card | 30.00 | 2013 Dec. 15 | in-app payment platform |
| 7 | YiXun Store | XXX item | 120.60 | 2013 Dec. 10 | in-app payment platform |
| 8 | XYZ Online Store | BBB item | 60.40 | 2013 Dec. 10 | in-app payment platform |
| — | — | — | — | — | in-app payment platform |

Based on the foregoing, Table 3 and Table 4 are combined to provide transaction information as shown in Table 6:

| Record number | Account | Recipient | Transaction | Amount (Yuan) | Transaction time | Transaction platform |
|---|---|---|---|---|---|---|
| 1 | Zhang San | ABC Company | Phone recharge | 100.00 | 2013 Dec. 25 | social networking payment platform |
| 2 | Zhang San | Tencent | Annual membership fee | 120.00 | 2013 Dec. 22 | social networking payment platform |
| 3 | Zhang San | YiXun Store | XXX item | 530.40 | 2013 Dec. 9 | social networking payment platform |
| 4 | Li Si | XYZ Online Store | AA item | 3.40 | 2013 Dec. 5 | social networking payment platform |
| 5 | Li Si | ABC Company | Phone recharge | 50.00 | 2013 Dec. 26 | in-app payment platform |
| 6 | Zhang San | Tencent | Game card | 30.00 | 2013 Dec. 15 | in-app payment platform |
| 7 | Zhang San | YiXun Store | XXX item | 120.60 | 2013 Dec. 10 | in-app payment platform |
| 8 | Zhang San | XYZ Online Store | BBB item | 60.40 | 2013 Dec. 10 | in-app payment platform |
| ... | ... | ... | ... | ... | ... | in-app payment platform |

For example, a plurality of users share a same client device and each of the users has a respective account for social networking platform. In this example, after a respective account logs into the social networking platform on the client device, the user associated with the respective account performs one or more payment transactions using different payment platforms. Subsequently, transaction data for the one or more payment transactions is stored. Typically, a user does not care about transaction information corresponding to payment transaction initiated by other accounts. Additionally, transaction information for a respective payment transaction is generally private information that cannot be viewed by all users using the client device save the user associated with the account that initiated the respective payment transaction. Therefore, in some embodiments: after authenticating an account for the social networking platform corresponding to a respective user, the computers system obtains combined transaction information for a payment transactions that corresponds to the authenticated account.

Based on the foregoing, using Table 3 and Table 4 as examples and assuming that the authenticated account corresponds to Zhang San, the combined transaction information is provided as shown in Table 7:

| Record number | Account | Recipient | Transaction | Amount (Yuan) | Transaction time | Transaction platform |
|---|---|---|---|---|---|---|
| 1 | Zhang San | ABC Company | Phone recharge | 100.00 | 2013 Dec. 25 | social networking payment platform |
| 2 | Zhang San | Tencent | Annual membership fee | 120.00 | 2013 Dec. 22 | social networking payment platform |
| 3 | Zhang San | YiXun Store | XXX item | 530.40 | 2013 Dec. 9 | social networking payment platform |
| 4 | Zhang San | Tencent | Game card | 30.00 | 2013 Dec. 15 | in-app payment platform |
| 5 | Zhang San | YiXun Store | XXX item | 120.60 | 2013 Dec. 10 | in-app payment platform |
| 6 | Zhang San | XYZ Online Store | BBB item | 60.40 | 2013 Dec. 10 | in-app payment platform |
| ... | ... | ... | ... | ... | ... | in-app payment platform |

In some embodiments, the number of transaction information entries associated with an account is great, and a user corresponding to the account may only want to see a portion of the transaction information entries associated with his/her account. In one example, the user may only want to see transaction information for payment transaction occurring within a specified window such as the last three months, the last month, or the past three days. In another example, the user may only want to see transaction information for payment transactions exceeding a specified amount. In another example, the user may only want to see transaction information for payment transactions corresponding to a specified category. In yet another example, the user may only want to see transaction information for payment transactions corresponding to a particular recipient. In some embodiments, the transaction history request includes one or more screening parameters. In some embodiments, after authenticating an account for the social networking platform corresponding to a respective user, the computers system: obtains combined transaction information for a payment transactions that corresponds to the authenticated account; screens the combined transaction information according to the one or more screening parameters; and provides the screened transaction information to the respective user.

Based on the foregoing, using Table 3 and Table 4 as examples and assuming that the authenticated account corresponds to Zhang San, the transaction history request includes a screening parameter for payment transaction exceeding 100 Yuan. As such, the combined transaction information is provided as shown in Table 8:

| Record number | Account | Recipient | Transaction | Amount (Yuan) | Transaction time | Transaction platform |
|---|---|---|---|---|---|---|
| 1 | Zhang San | ABC Company | Phone recharge | 100.00 | 2013 Dec. 25 | social networking payment platform |
| 2 | Zhang San | Tencent | Annual membership fee | 120.00 | 2013 Dec. 22 | social networking payment platform |
| 3 | Zhang San | YiXun Store | XXX item | 530.40 | 2013 Dec. 9 | social networking payment platform |

-continued

| Record number | Account | Recipient | Transaction | Amount (Yuan) | Transaction time | Transaction platform |
|---|---|---|---|---|---|---|
| 4 | Zhang San | YiXun Store | XXX item | 120.60 | 2013 Dec. 10 | in-app payment platform |
| ... | ... | ... | ... | ... | ... | in-app payment platform |

Based on the foregoing, using Table 3 and Table 4 as examples and assuming that the authenticated account corresponds to Zhang San, the transaction history request includes a screening parameter for payment transaction exceeding 100 Yuan. Furthermore, as a default sorting parameter, payment transactions are sorted in an inverted chronological order for readability when providing combined transaction information. As such, the combined transaction information is provided as shown in Table 9:

| Record number | Account | Recipient | Transaction | Amount (Yuan) | Transaction time | Transaction platform |
|---|---|---|---|---|---|---|
| 1 | Zhang San | ABC Company | Phone recharge | 100.00 | 2013 Dec. 25 | social networking payment platform |
| 2 | Zhang San | Tencent | Annual membership fee | 120.00 | 2013 Dec. 22 | social networking payment platform |
| 3 | Zhang San | YiXun Store | XXX item | 120.60 | 2013 Dec. 10 | in-app payment platform |
| 4 | Zhang San | YiXun Store | XXX item | 530.40 | 2013 Dec. 9 | social networking payment platform |
| ... | ... | ... | ... | ... | ... | in-app payment platform |

Figure 7:
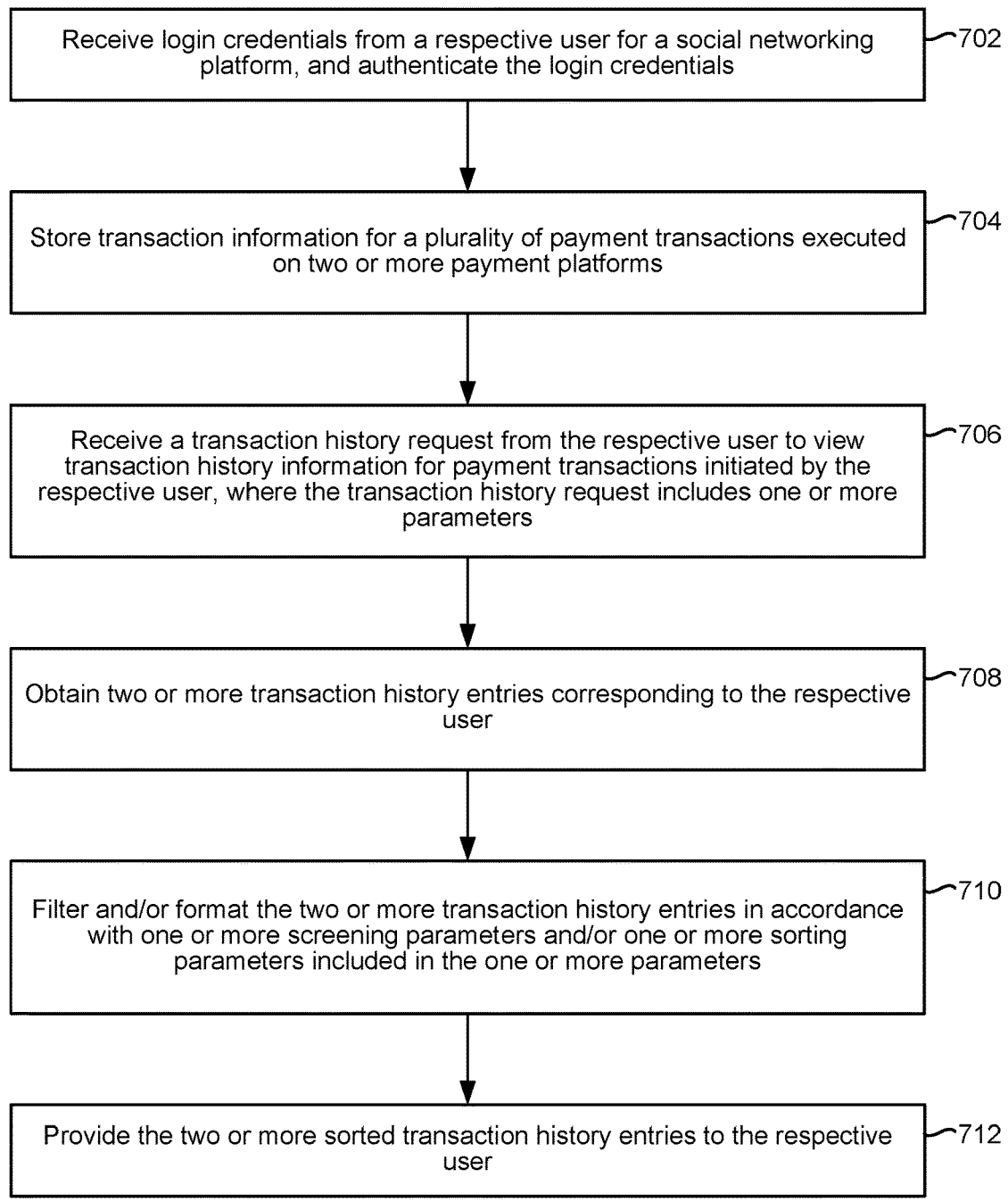
FIG. 7 illustrates a flowchart diagram of a method of maintaining transaction information for a plurality of payment platforms in accordance with some embodiments.

FIG. 7 illustrates a flowchart diagram of a method 700 of maintaining transaction information for a plurality of payment platforms in accordance with some embodiments. In some embodiments, method 700 is performed by a computers system with one or more processors and memory. For example, the computers system is implemented as server system 108 (FIG. 1-2), client device 104 (FIGS. 1 and 3), or a combination thereof. In some embodiments, the computers system manages a social networking platform that enables real-time chat/messaging between users, and the computers system also provides payment processing services (e.g., a payment platform) for transactions initiated at a merchant's website or within the social networking platform.

For example, the first payment platform is associated with a social networking platform and the second payment platform is associated with in-app payment platform. Continuing with this example, in method 700, a respective user logs into their corresponding account on the social networking platform and initiates a transaction history request using the social networking platform.

In some embodiments, the computer system receives (702) login credentials from a respective user in order to login in a corresponding account of a social networking platform. In some embodiments, the login credentials are authenticated and, if the authentication succeeds, the account is logged into the social networking platform under a corresponding account. In some embodiments, the computer system authenticates the login credentials by verifying that the login credentials match login credentials stored in a user profile for the respective user.

In some embodiments, the computer system stores (704) transaction information for a plurality of payment transactions executed on two or more payment platforms. For example, the server stores a first transaction information entry for a first payment transaction executed by a first payment platform corresponding to the social networking platform and a second transaction information entry for a second payment transaction executed by a second payment platform corresponding to an application marketplace.

In some embodiments, the computer system receives (706) a transaction history request from the respective user to view transaction history information for payment transactions initiated by the respective user, where the transaction history request includes one or more parameters.

In some embodiments, in response to receiving the transaction history request, the computer system obtains (708) two or more transaction history entries corresponding to the respective user.

In some embodiments, the computer system filters and/or formats (710) the two or more transaction history entries in accordance with one or more screening parameters and/or one or more sorting parameters included in the one or more parameters.

In some embodiments, the computer system provides (712) the two or more sorted transaction history entries to the respective user.

In this embodiment, the computer system obtains transaction information for payment transactions executed on different payment platforms so as to provide combined transaction information to the respective user. In this way, the respective user does not need to separately request transaction information from each of the plurality of payment platforms nor does the respective user have to view the transaction information in a plurality of transaction information formats. Therefore, the efficiency of providing transaction information is improved.

Figure 8A:
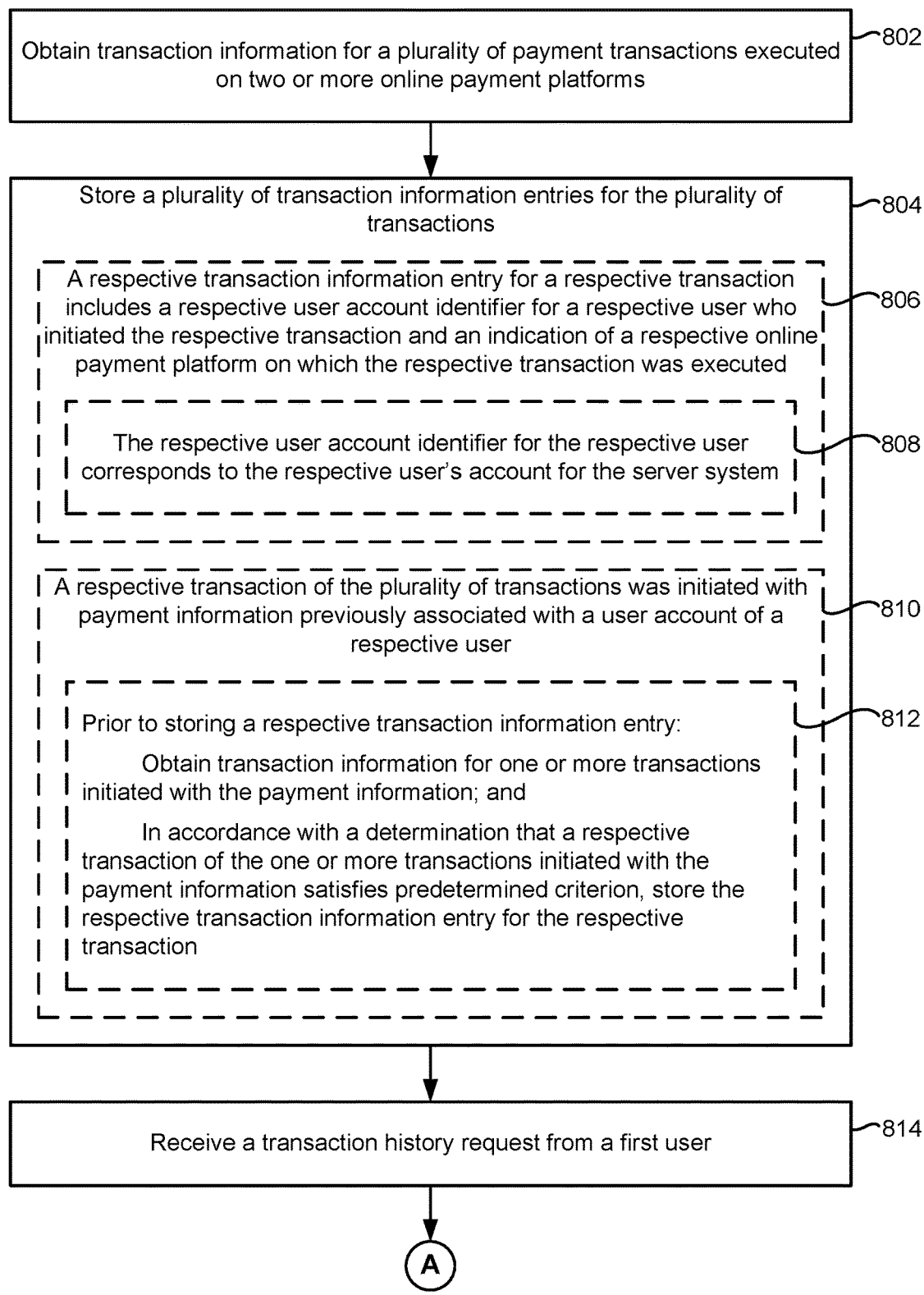
FIGS. 8A-8B illustrate a flowchart diagram of a method of maintaining transaction information for a plurality of payment platforms in accordance with some embodiments.
Figure 8B:
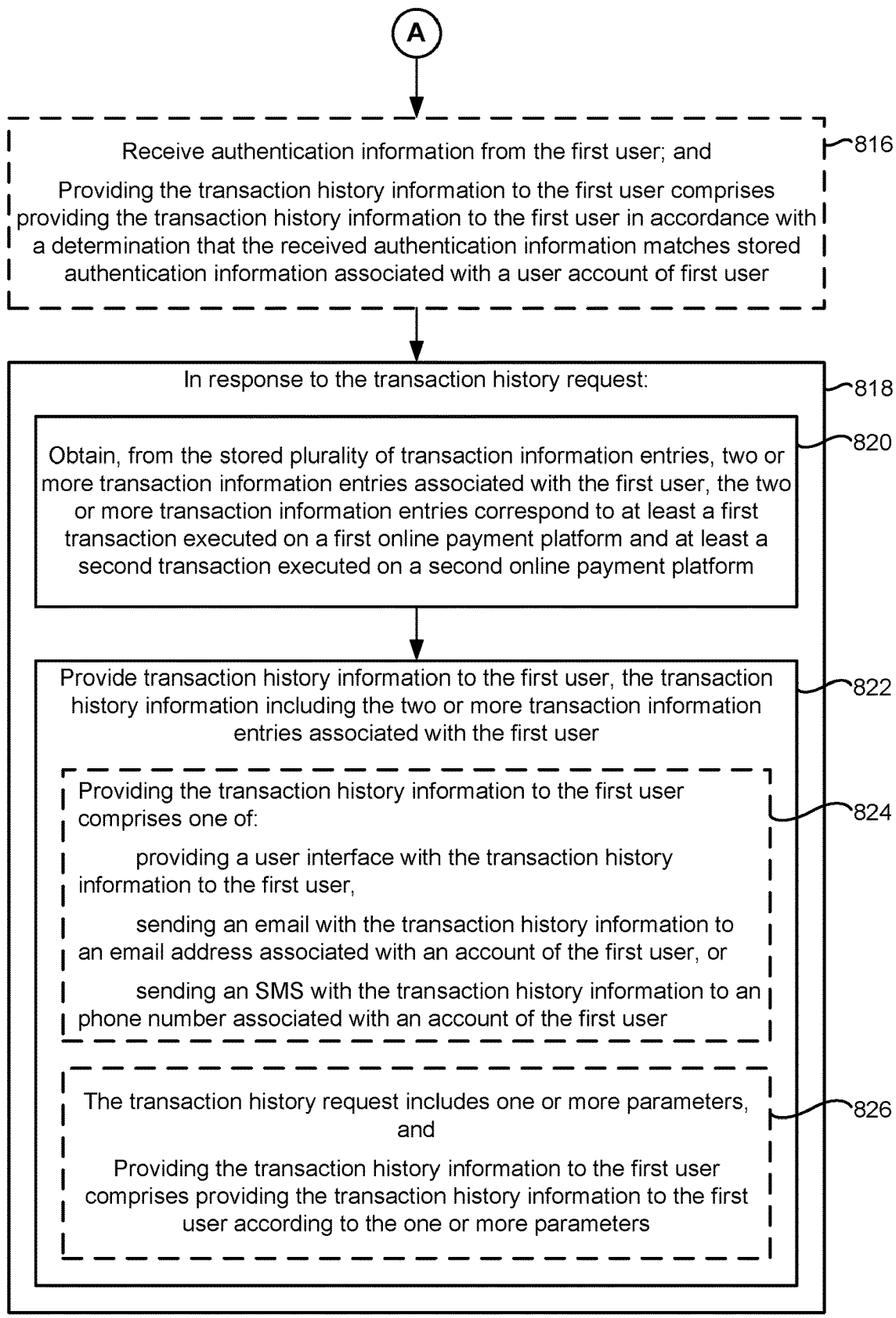

FIGS. 8A-8B illustrate a flowchart diagram of a method 800 of sharing order information via a social networking platform in accordance with some embodiments. In some embodiments, method 800 is performed by a server system 108 with one or more processors and memory. For example, in some embodiments, method 800 is performed by server system 108 (FIGS. 1-2) or a component thereof (e.g., server-side module 106, FIGS. 1-2). In some embodiments, method 800 is governed by instructions that are stored in a non-transitory computer readable storage medium and the instructions are executed by one or more processors of the server system. Optional operations are indicated by dashed lines (e.g., boxes with dashed-line borders).

The server obtains (802) transaction information for a plurality of payment transactions executed on two or more online payment platforms. In some embodiments, server system 108 manages a social networking platform that enables real-time chat/messaging between users, and server system 108 also provides payment processing services for transaction initiated at a merchant's website or within the social networking platform. For example, the two or more online payment platforms include payment processing services associated with a social networking platform (e.g., WeChat™ app), payment processing for application marketplaces (e.g., Apple™ App Store, Google Play™ for Android™, etc.), payment processing for in-app purchases (e.g., additional levels or character upgrades for a game), payment processing for online websites or merchants, and the like.

In some embodiments, for a respective user of the social networking platform, server system 108 or a component thereof (e.g., obtaining module 222, FIG. 2) obtains transaction information for transactions processed by the payment processing services of the social networking platform and/or by other payment platforms. For example, a payment transaction is processed by the social networking platform for a purchase within the social networking platform. In another example, a payment transaction is processed by the social networking platform for a purchase initiated at a merchant website or another application. In a further example, a payment transaction is processed by another payment platform for a purchase made within another application (e.g., a purchase within a game or within an application marketplace) or at a merchant website.

The server system stores (804) a plurality of transaction information entries for the plurality of payment transactions. In some embodiments, transaction information database 114 is stored and managed by server system 108 or a component thereof (e.g., storing module 226, FIG. 2). In FIG. 4, for example, transaction information database 114 includes a plurality of transaction information entries 412 for each of a plurality of payment transactions. In some embodiments, the plurality of payment transactions correspond to payment transactions executed on two or more online payment platforms. In some embodiments, transaction information database 114 is stored remote from server system 108 but is managed by server system 108.

In some embodiments, prior to storing a transaction information entry in transaction information database 114 for a payment transaction, server system 108 or a component thereof (e.g., categorizing module 224, FIG. 2) determines a category associated with the payment transaction or the items corresponding to the payment transaction. In FIG. 4, category field 424 of transaction information entry 412-N identifies a category associated with the payment transaction. For example, the category corresponds to the method by which the payment transaction was initiated (e.g., in-app, application marketplace, or online shopping purchase). In another example, the category corresponds to items included in the payment transaction (e.g., automotive parts, sporting goods, groceries, clothing, etc.).

In some embodiments, a respective transaction information entry for a respective payment transaction includes (806) a respective user account identifier for a respective user who initiated the respective payment transaction and an indication of a respective online payment platform on which the respective payment transaction was executed. FIG. 4, for example, shows representative transaction information entry 412-N for a payment transaction with a plurality of fields: entry number/identifier 422, category 424, user name 426, transaction 428, merchant 430, payment platform 434, date/time 434, and transaction amount 436. In FIG. 4, user name field 426 of transaction information entry 412-N identifies an account or user name in the social networking platform for the user who initiated the payment transaction. In FIG. 4, payment platform field 432 of transaction information entry 412-N identifies the payment platform on which the payment transaction was executed.

In some embodiments, the respective user account identifier for the respective user corresponds (808) to the respective user's account for the server system. For example, prior to initiating the respective transaction at the payment platform, the respective user signs into an account associated with the social networking platform managed by server system 108. As such, any payment transactions and resulting transaction history information entries are associated with the account currently logged into the social networking platform.

In some embodiments, a respective payment transaction of the plurality of payment transactions was initiated (810) with payment information previously associated with a user account of a respective user. In some embodiments, server system 108 stores a user profile for the respective user in profiles database 116 which includes payment data/information (e.g., credit card information) linked to the respective user's account for the social networking platform. For example, when executing a payment transaction with the payment platform or payment processing services provided by the social networking platform, the payment data/information that was previously linked to the respective user's account for the social networking platform (e.g., upon setup of the account) is used to process the payment transaction. In another example, when executing a payment transaction with an alternate payment platform, the payment data/information, which also was previously linked to the respective user's account for the social networking platform, is used to process the payment transaction. Thus, in accordance with some embodiments, an external service 122 associated with the payment data/information (e.g., a credit card company) includes transaction information for the payment transactions executed on the payment platform provided by the social networking platform and the alternate payment platform.

In some embodiments, prior to storing a respective transaction information, the server (812): obtains transaction information for one or more payment transactions initiated with the payment information; and, in accordance with a determination that a respective payment transaction of the one or more payment transactions initiated with the payment information satisfies predetermined criterion, stores the respective transaction information entry for the respective payment transaction. For example, a credit card is linked to a user's account for the social networking platform. Continuing with this example, system 108 scrapes or crawls the credit card company's website for payment transactions initiated with the linked credit card that match predetermined criterion specified by the user. In this example, predetermined criterion specifies that the user wishes to see transaction history information related to specified categories of payment transactions such as online purchases, in-app purchase, or purchases in application marketplaces.

The server receives (814) a transaction history request from a first user. In some embodiments, server system 108 or a component thereof (e.g., request handling module 230, FIG. 2) receives the transaction history request from a user of the social networking platform for transaction history information corresponding to payment transaction initiated by the user. For example, the first user previously logged into an account for the social networking platform and is sending the transaction history request via the social networking platform. In this example, the transaction history request identifies the account in the social networking platform of the user that sent the transaction history request.

In some embodiments, the server receives (816) authentication information from the first user and providing the transaction history information to the first user comprises providing the transaction history information to the first user in accordance with a determination that the received authentication information matches stored authentication information associated with a user account of first user. In some embodiments, server system 108 or a component thereof (e.g., authenticating module 228, FIG. 2) receives login credentials (e.g., a user name and password) for a user attempting to log into the social networking platform and verifies that the login credentials match login credentials stored in a user profile for the user in profiles database 116. For example, the user logins into the social networking platform prior to sending the transaction history request or prior to initiating a payment transaction. As such, a user isn't provided with transaction information unless they have been properly authenticated.

In response to the transaction history request (818), the server obtains (820), from the stored plurality of transaction information entries, two or more transaction information entries associated with the first user, the two or more transaction information entries correspond to at least a first payment transaction executed on a first online payment platform and at least a second payment transaction executed on a second online payment platform. In some embodiments, in response to receiving the transaction history request, server system 108 or a component thereof (e.g., request handling module 230, FIG. 2) obtains transaction information entries from transaction information database 114 that correspond to the account of the user who sent the transaction history request. In some embodiments, the obtains transaction information entries include two or more transaction information entries, where at least one transaction information entry corresponds to a first payment transaction executed on a first online payment platform (e.g., payment processing services provided by the social networking platform) and at least one transaction information entry corresponds to a second payment transaction executed on a second online payment platform (e.g., payment processing for an application marketplace).

In response to the transaction history request (818), the server provides (822) transaction history information to the first user, the transaction history information including the two or more transaction information entries associated with the first user. In some embodiments, server system 108 or a component thereof (e.g., providing module 234, FIG. 2) provides the two or more transaction information entries to the first user.

In some embodiments, providing the transaction history information to the first user comprises one of (824): providing a user interface with the transaction history information to the first user, sending an email with the transaction history information to an email address associated with an account of the first user, or sending an SMS with the transaction history information to an phone number associated with an account of the first user. For example, providing module 234 provides the transaction history information to the first user for display on client device 104, as an email, or as an SMS. In some embodiments, the transaction history information is provided to the first user in a manner specified in a user profile of the first user for the social networking platform and is stored in profiles database 116. In some embodiments, the transaction history information is provided to the first user in a default manner.

In some embodiments, the transaction history request includes (826) one or more parameters and providing the transaction history information to the first user comprises providing the transaction history information to the first user according to the one or more parameters. In some embodiments, server system 108 or a component thereof (e.g., sorting/screening module 232, FIG. 2) provides the transaction history information to the first user according to the one or more parameters included in the transaction history request. In some embodiments, the one or more parameters include one or more screening parameters and/or one or more sorting parameters. For example, the one or more screening parameters indicate that the user wishes to see transaction history information for a window of time (e.g., the last year, the last 90 days, the last week, etc.) or that the user wishes to see transaction history information for payment transactions exceeding a specified threshold (e.g., only payment transactions over $100.00). For example, one or more sorting parameters indicate that the user wishes to transaction history information in a specified format such as in reverse chronological order or in descending order based on amount.

Figure 9:
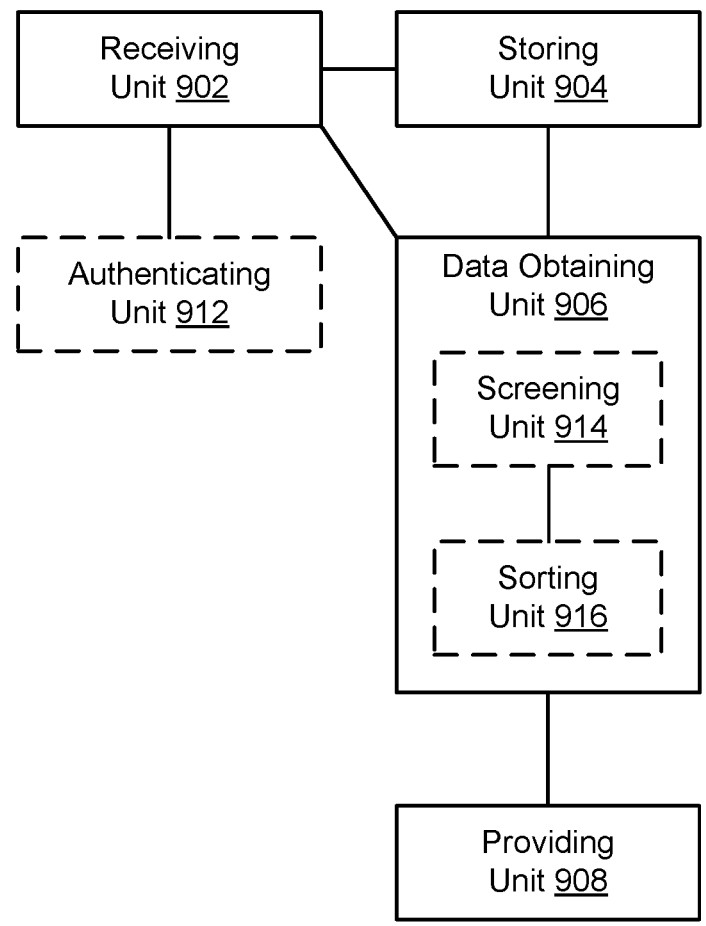
FIG. 9 is a block diagram of a computer system in accordance with some embodiments.

FIG. 9 is a block diagram of a computer system 900 in accordance with some embodiments. For example, computer system 900 corresponds to the computer system in methods 600 and 700 in FIGS. 6 and 7, respectively. In some embodiments, computer system 900 manages a social networking platform and supports communication groups which provide information interaction services for groups of contacts of the social networking platform. In some embodiments, computer system 900 includes: receiving unit 902, storing unit 904, data obtaining unit 906, and providing unit 908. Optional modules are indicated by dashed lines (e.g., boxes with dashed-line borders).

In some embodiments, receiving unit 902 is configured to receive transaction information for payment transactions executed on two or more payment platforms and to receive a transaction history request from a respective user.

In some embodiments, storing unit 904 is configured to store (e.g., in transaction information database 114, FIGS. 1 and 4) transaction information entries for each payment transaction.

In some embodiments, data obtaining unit 906 is configured to obtain transaction history information in response to the transaction history request from the respective user. In some embodiments, transaction history information includes two or more transaction information entries initiated by the respective user for at least a first payment transaction executed on a first payment platform and a second payment transaction executed on a second payment platform.

In some embodiments, providing unit 908 is configured to provide the obtained transaction history information to the respective user.

In some embodiments, computer system 900 optionally includes: authenticating unit 912, screening unit 914, and sorting unit 916.

In some embodiments, authenticating unit 912 is configured to authenticate login credentials (e.g., user name and password) received from the respective user so as to log the respective user into an account for the social networking platform.

In some embodiments, screening unit 914 is configured to screen/filter the obtained transaction history information for the respective user according to one or more screening parameters included in the transaction history request.

In some embodiments, sorting unit 916 is configured to sort the obtained transaction history information according to one or more sorting parameters included in the transaction history request.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

What is claimed is:

1. A method of managing transaction information performed at a server of a social networking platform, the method comprising:
    enabling real-time messaging between a plurality of users, wherein each of the plurality of users is a registered user of the social networking platform and is associated with a respective user account identifier in the social networking platform at a corresponding mobile phone;
    performing, via the social networking platform, a plurality of operations including:
        obtaining transaction information for a plurality of payment transactions executed on two or more online payment platforms, the plurality of payment transactions including at least a first payment transaction made through the social networking platform and a second payment transaction made through an in-app purchase platform via a mobile application running on a mobile terminal through the social networking platform, wherein obtaining the transaction information includes:
        for each user account identifier of the plurality of user account identifiers associated with the plurality of users registered on the social networking platform:
            proactively crawling one or more credit card providers' websites to gather payment transactions initiated with cards that are linked to the user account identifier at the server of the social networking platform;
        storing in a database associated with the social networking platform a plurality of transaction information entries for the plurality of payment transactions;
        receiving, from a first mobile phone, a transaction history request having a predefined time window from a first registered user of the social networking platform, the first registered user having a first user account identifier; and
    in response to the transaction history request:
        obtaining, from the stored plurality of transaction information entries according to the first user account identifier, two or more transaction information entries associated with the first user at the first mobile phone, the two or more transaction information entries including a first transaction information entry of the two or more transaction information entries associated with a first transaction executed on the social networking platform by the first mobile phone and a second transaction information entry of the two or more transaction information entries associated with a second transaction executed on the in-app purchase platform by the first mobile phone, wherein the social networking platform is distinct from the in-app purchase platform;
        displaying, on the first mobile phone associated with the first user, an instant messaging interface of the social networking platform including the transaction history request in form of a first instant message from the first user;
        providing, in form of a second instant message to the first user, transaction history information to the first user through the instant messaging interface of the social networking platform, the transaction history information including the two or more transaction information entries associated with the first user; and
        sending an email with the transaction history information to an email address associated with the first user.

2. The method of claim 1, wherein a respective transaction information entry for a respective payment transaction of the plurality of payment transactions includes a respective user account identifier for a respective user who initiated the respective payment transaction and an indication of a respective online payment platform on which the respective payment transaction was executed.

3. The method of claim 1, wherein a respective payment transaction of the plurality of payment transactions was initiated with payment information previously associated with a user account of a respective user.

4. The method of claim 3, further comprising:
    prior to storing the respective transaction information entry:
        obtaining transaction information for one or more payment transactions initiated with the payment information; and
        in accordance with a determination that a respective payment transaction of the one or more payment transactions initiated with the payment information satisfies predetermined criterion, storing the respective transaction information entry for the respective payment transaction.

5. The method of claim 1, further comprising:
    receiving authentication information from the first user; and
    wherein providing the transaction history information to the first user comprises providing the transaction history information to the first user in accordance with a determination that the received authentication information matches stored authentication information associated with a user account of the first user.

6. The method of claim 1, further comprising:
    providing the transaction history information to the first user by sending an SMS with the transaction history information to a phone number associated with an account of the first user.

7. The method of claim 1, wherein the transaction history request includes one or more parameters, and
    wherein providing the transaction history information to the first user comprises providing the transaction history information to the first user according to the one or more parameters.

8. A server system for a social networking platform, comprising:
one or more processors; and
memory storing one or more programs to be executed by the one or more processors, the one or more programs comprising instructions for:
enabling real-time messaging between a plurality of users, wherein each of the plurality of users is a registered user of the social networking platform and is associated with a respective user account identifier in the social networking platform at a corresponding mobile phone;
performing, via the social networking platform, a plurality of operations including:
obtaining transaction information for a plurality of payment transactions executed on two or more online payment platforms, the plurality of payment transactions including at least a first payment transaction made through the social networking platform and a second payment transaction made through an in-app purchase platform via a mobile application running on a mobile terminal through the social networking platform, wherein obtaining the transaction information includes:
for each user account identifier of the plurality of user account identifiers associated with the plurality of users registered on the social networking platform:
proactively crawling one or more credit card providers' websites to gather payment transactions initiated with cards that are linked to the user account identifier at the server of the social network platform;
storing in a database associated with the social networking platform a plurality of transaction information entries for the plurality of payment transactions;
receiving, from a first mobile phone, a transaction history request having a predefined time window from a first registered user of the social networking platform, the first registered user having a first user account identifier; and
in response to the transaction history request:
obtaining, from the stored plurality of transaction information entries according to the first user account identifier, two or more transaction information entries associated with the first user at the first mobile phone, the two or more transaction information entries including a first transaction information entry of the two or more transaction information entries associated with a first transaction executed on the social networking platform by the first mobile phone and a second transaction information entry of the two or more transaction information entries associated with a second transaction executed on the in-app purchase platform by the first mobile phone, wherein the social networking platform is distinct from the in-app purchase platform;
displaying, on the first mobile phone associated with the first user, an instant messaging interface of the social networking platform including the transaction history request in form of a first instant message from the first user;
providing, in form of a second instant message to the first user, transaction history information to the first user through the instant messaging interface of the social networking platform, the transaction history information including the two or more transaction information entries associated with the first user; and
sending an email with the transaction history information to an email address associated with the first user.

9. The server system of claim 8, wherein a respective transaction information entry for a respective payment transaction of the plurality of payment transactions includes a respective user account identifier for a respective user who initiated the respective payment transaction and an indication of a respective online payment platform on which the respective payment transaction was executed.

10. The server system of claim 8, wherein a respective payment transaction of the plurality of payment transactions was initiated with payment information previously associated with a user account of a respective user.

11. The server system of claim 10, wherein the one or more programs comprise instructions for:
prior to storing the respective transaction information entry:
obtaining transaction information for one or more payment transactions initiated with the payment information; and
in accordance with a determination that a respective payment transaction of the one or more payment transactions initiated with the payment information satisfies predetermined criterion, storing the respective transaction information entry for the respective payment transaction.

12. The server system of claim 8, the one or more programs comprise instructions for:
providing the transaction history information to the first user by or sending an SMS with the transaction history information to a phone number associated with an account of the first user.

13. The server system of claim 8, wherein the transaction history request includes one or more parameters, and
wherein providing the transaction history information to the first user comprises providing the transaction history information to the first user according to the one or more parameters.

14. A non-transitory computer readable storage medium storing one or more programs, the one or more programs comprising instructions, which, when executed by a server system of a social networking platform with one or more processors, cause the server system to perform operations comprising:
enabling real-time messaging between a plurality of users, wherein each of the plurality of users is a registered user of the social networking platform and is associated with a respective user account identifier in the social networking platform at a corresponding mobile phone;
performing, via the social networking platform, a plurality of operations including:
obtaining transaction information for a plurality of payment transactions executed on two or more online payment platforms, the plurality of payment transactions including at least a first payment transaction made through the social networking platform and a second payment transaction made through an in-app purchase platform via a mobile application running on a mobile terminal through the social networking platform, wherein obtaining the transaction information includes:

for each user account identifier of the plurality of user account identifiers associated with the plurality of users registered on the social networking platform:
proactively crawling one or more credit card providers' websites to gather payment transactions initiated with cards that are linked to the user account identifier at the server of the social networking platform;

storing in a database associated with the social networking platform a plurality of transaction information entries for the plurality of payment transactions;

receiving, from a first mobile phone, a transaction history request having a predefined time window from a first registered user of the social networking platform, the first registered user having a first user account identifier; and in response to the transaction history request:
obtaining, from the stored plurality of transaction information entries according to the first user account identifier, two or more transaction information entries associated with the first user at the first mobile phone, the two or more transaction information entries including a first transaction information entry of the two or more transaction information entries associated with a first transaction executed on the social networking platform by the first mobile phone and a second transaction information entry of the two or more transaction information entries associated with a second transaction executed on the in-app purchase platform by the first mobile phone, wherein the social networking platform is distinct from the in-app purchase platform;

displaying, on the first mobile phone associated with the first user, an instant messaging interface of the social networking platform including the transaction history request in form of a first instant message from the first user;

providing, in form of a second instant message to the first user, transaction history information to the first user through the instant messaging interface of the social networking platform, the transaction history information including the two or more transaction information entries associated with the first user; and sending an email with the transaction history information to an email address associated with the first user.

15. The non-transitory computer readable storage medium of claim 14, wherein a respective payment transaction of the plurality of payment transactions was initiated with payment information previously associated with a user account of a respective user.

16. The non-transitory computer readable storage medium of claim 15, wherein the one or more programs comprise instructions that cause the server system to perform operations comprising:
prior to storing the respective transaction information entry:
obtaining transaction information for one or more payment transactions initiated with the payment information; and
in accordance with a determination that a respective payment transaction of the one or more payment transactions initiated with the payment information satisfies predetermined criterion, storing the respective transaction information entry for the respective payment transaction.

17. The non-transitory computer readable storage medium of claim 14, further comprising:
sending an SMS with the transaction history information to a phone number associated with an account of the first user.

18. The non-transitory computer readable storage medium of claim 14, wherein the transaction history request includes one or more parameters, and
wherein providing the transaction history information to the first user comprises providing the transaction history information to the first user according to the one or more parameters.

* * * * *